(12) United States Patent
Beausoliel et al.

(10) Patent No.: US 7,545,242 B2
(45) Date of Patent: Jun. 9, 2009

(54) DISTRIBUTING CLOCK SIGNALS USING METAMATERIAL-BASED WAVEGUIDES

(75) Inventors: Raymond G. Beausoliel, Redmond, WA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 11/264,410

(22) Filed: Nov. 1, 2005

(65) Prior Publication Data

US 2007/0109023 A1    May 17, 2007

(51) Int. Cl.
*H01P 1/00* (2006.01)
*H01P 3/00* (2006.01)
(52) U.S. Cl. ........................... 333/239; 333/248
(58) Field of Classification Search ............... 333/208, 333/209, 239, 248
See application file for complete search history.

(56) References Cited

U.S. PATENT DOCUMENTS 7,106,494 B2 *   9/2006   Osipov et al. ............... 359/299
7,205,941 B2 *   4/2007   Wang et al. ........... 343/700 MS

* cited by examiner

*Primary Examiner*—Benny Lee
*Assistant Examiner*—Kimberly E Glenn

(57) ABSTRACT

Various embodiments of the present invention are directed to global interconnects that employ metamaterial-based waveguides to distribute clock signals to IC internal components. In one embodiment of the present invention, a global interconnect includes an electromagnetic radiation source that radiates electromagnetic waves. The global interconnect also includes a metamaterial-based waveguide that directs a transverse magnetic field mode of the electromagnetic wave to antennae of the internal components in order to induce an oscillating current within the internal components that serves as the clock signal.

33 Claims, 15 Drawing Sheets

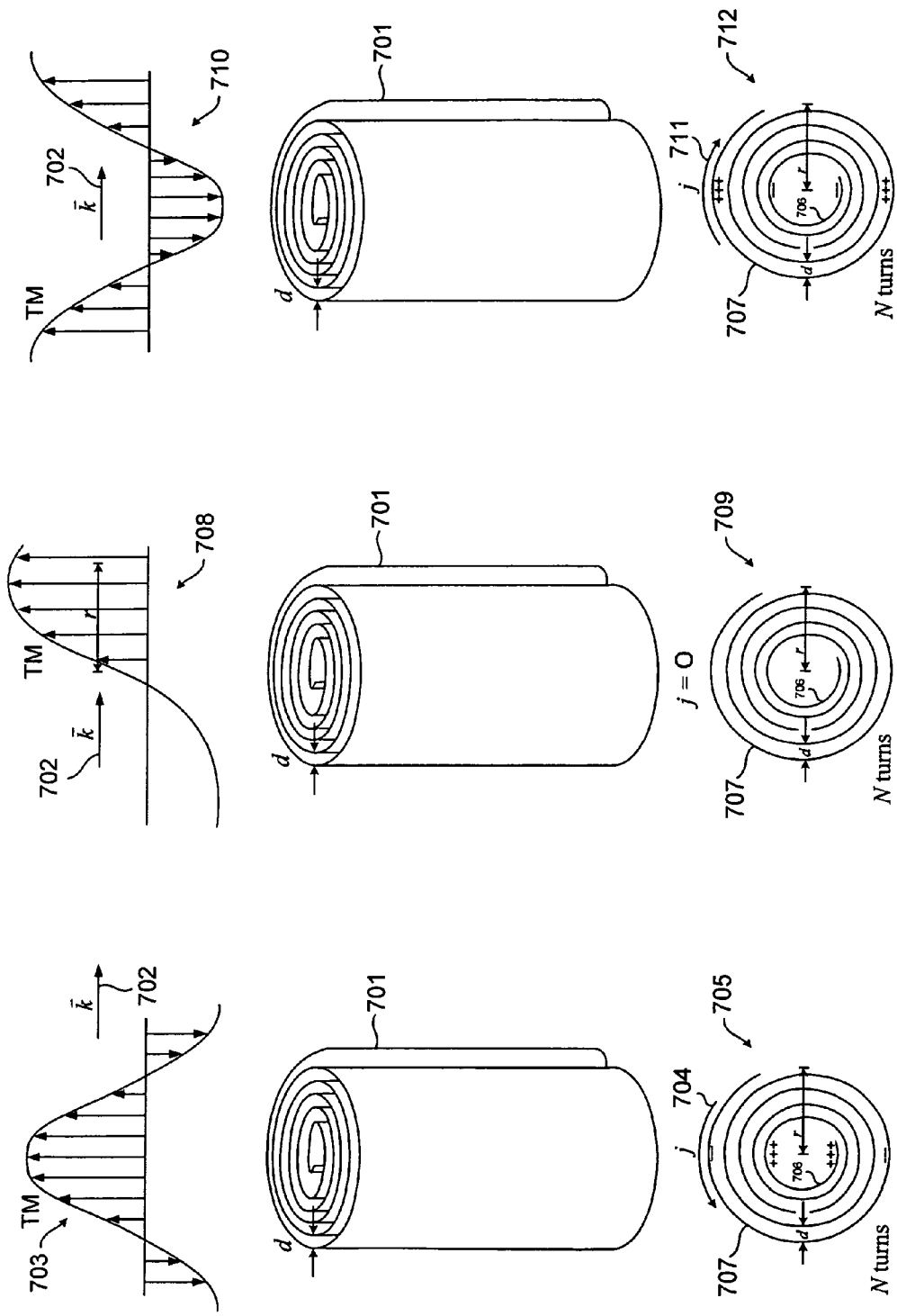

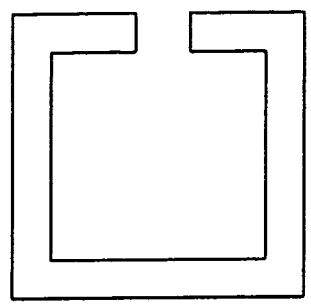
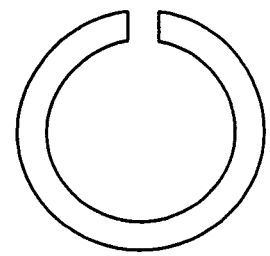
*Figure 8A*  *Figure 8B*
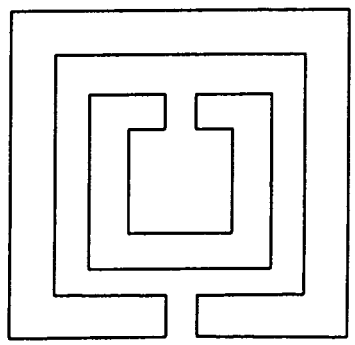
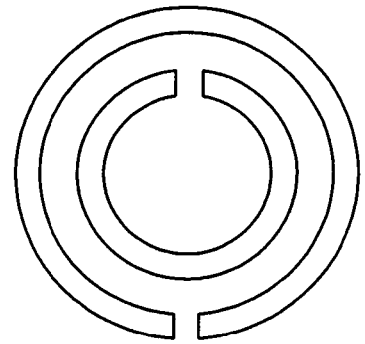
*Figure 8C*  *Figure 8D*
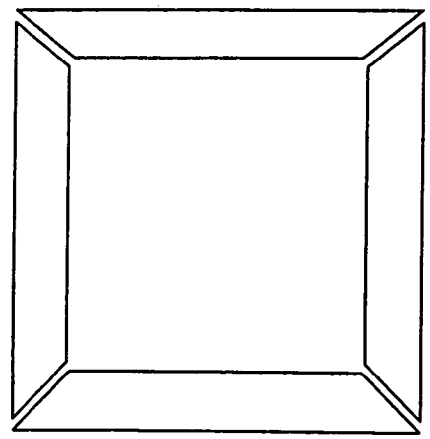
*Figure 8E*

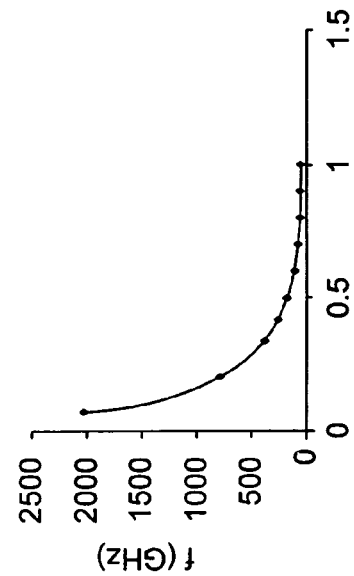
Figure 15D
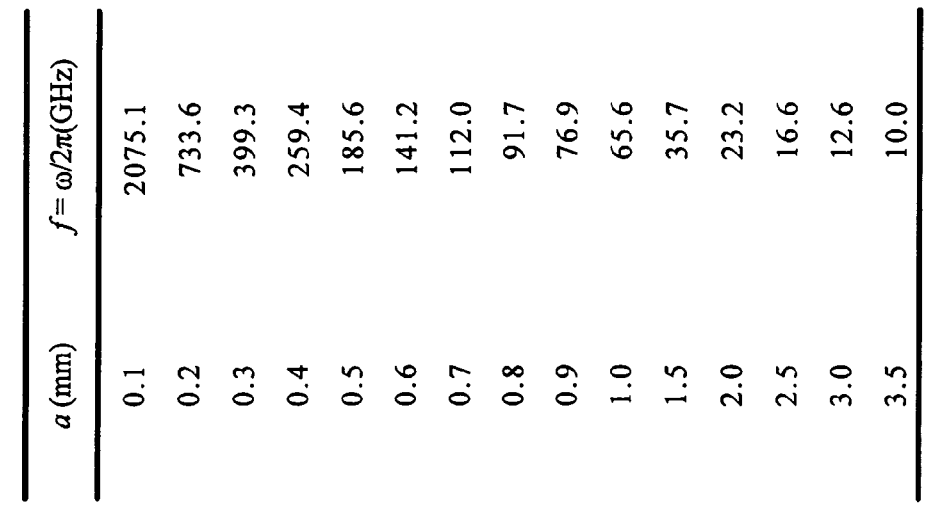
| $a$ (mm) | $f = \omega/2\pi$(GHz) |
|---|---|
| 0.1 | 2075.1 |
| 0.2 | 733.6 |
| 0.3 | 399.3 |
| 0.4 | 259.4 |
| 0.5 | 185.6 |
| 0.6 | 141.2 |
| 0.7 | 112.0 |
| 0.8 | 91.7 |
| 0.9 | 76.9 |
| 1.0 | 65.6 |
| 1.5 | 35.7 |
| 2.0 | 23.2 |
| 2.5 | 16.6 |
| 3.0 | 12.6 |
| 3.5 | 10.0 |
Figure 15C
| $a$ (nm) | $f = \omega/2\pi$(THz) |
|---|---|
| 600 | 80 |
| 300 | 125 |
| 150 | 170 |
Figure 15E
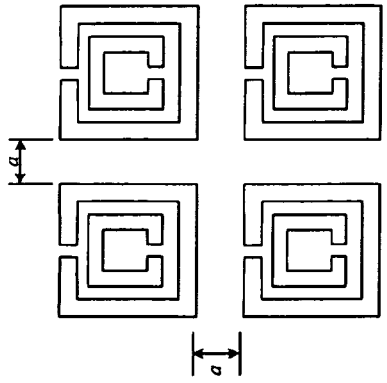
Figure 15A
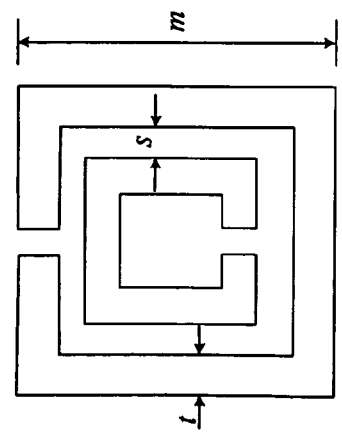
Figure 15B

DISTRIBUTING CLOCK SIGNALS USING METAMATERIAL-BASED WAVEGUIDES

TECHNICAL FIELD

The present invention relates to integrated circuits, and, in particular, to waveguides composed of metamaterials that can be used to distribute clock signals to integrated circuit internal components.

BACKGROUND OF THE INVENTION

During the past fifty years, the electronics and computing industries have steadily increased the speed of digital computing devices and made remarkable progress in reducing the size and speed of computing device internal components, such as logic circuits and memory. Internal components are typically integrated on a single substrate and referred to as a "chip or "integrated circuit" ("IC"). Networks of electrical interconnections, referred to as "global interconnects," link these internal components, such as interconnections that link logic and memory. Global interconnects are composed of signal lines that transmit data between internal components and distribute power and clock signals to internal components.

Clock signals are electrical signals that cycle between a high electrical state and a low electrical state at a specific rate. Typical ICs use a clock signal to synchronize the operation of different internal components. Internal components receiving a clock signal may become active on either the rising edge or the falling edge of each cycle of the clock signal. The rate at which the clock signal cycles between a high electronic state and a low electronic state is called the "clock rate." The clock rate, measured in cycles per second ("Hz"), is the rate at which an IC performs its most basic operations, such as transmitting data between internal components. As the clock rate is increased, the internal components generally transmit data and carry out instructions more quickly.

In order to decrease the amount of time needed to transmit data between internal components, ICs are typically designed so that the distances between internal components exchanging large amounts of data are shorter than the distances between internal components exchanging small amounts of data. However, a clock signal is typically distributed from a single clock signal source to each internal component over a single global interconnect. As a result, clock signals traverse the longest signal line distances, and operate at the highest speeds of any signal, either control or data, transmitted within the IC. The clock signal source may include a crystal, such as a quartz crystal, that generates the clock signal by oscillating at a predictable rate within the megahertz ("MHz") or gigahertz ("GHz") frequency ranges. For example, crystal-based clock rates as high as 3 GHz have been achieved.

FIGS. 1A-1B illustrate an exemplary global interconnect that distributes a clock signal to numerous internal components of a hypothetical IC. In FIG. 1A, IC 101 is composed of a number of internal components identified by rectangles. For example, rectangles 102-104 represent random access memory and rectangle 105 represents a central processing unit. A clock signal generated by clock signal source 106 is distributed to the internal components via a global interconnect comprising a network of signal lines, such as signal line 107. FIG. 1B is a plot of an exemplary clock signal distributed by clock signal source 106. The internal components of IC 101 may each be activated on a rising edge of a clock cycle, such as clock cycle edge 108. Because the global interconnect employs signal lines located between the internal components, internal components located farthest from clock signal source 106, such as internal component 102, may receive a clock cycle later than internal components located closer to clock signal source 106. As a result, the internal components do not all receive the same clock signal at the same time. For example, stippled internal component 105 may receive clock cycle 110 at about the same time blank internal component 109 receives clock cycle 111.

In spite of efforts to improve the design of IC architectures and the design of global interconnects to distribute clock signals, the percentage of a chip that can be reached within a few clock cycles has continued to decrease as the number of internal components integrated on a single chip has increased, and clock frequencies have increased. In addition, the global interconnects employed are rapidly approaching fundamental physical limits with respect to the information carrying capacity of metal wires. In general, as IC internal components and electronic interconnects shrink from microscale dimensions to nanoscale dimensions, intrinsic capacitance of the electronic interconnections greatly increases and exceeds that of the nanoscale internal components. As a result, the information carrying capacity of each wire in a global interconnect decreases, and closely spaced wires cannot be accessed at high speeds without creating interference, including inducing currents in adjacent wires. Thus, even though the internal component density can be increased by decreasing the size of IC internal components, the number of transistors that can be reached in one clock cycle of a clock signal may significantly decrease. Manufacturers, designers, and users of computing devices have recognized a need for new global interconnects that can uniformly distribute clock signals and can accommodate the ever increasing demand for higher clock rates.

SUMMARY OF THE INVENTION

Various embodiments of the present invention are directed to global interconnects that employ metamaterial-based waveguides to distribute clock signals to IC internal components. In one embodiment of the present invention, a global interconnect includes an electromagnetic radiation source that radiates electromagnetic waves. The global interconnect also includes a metamaterial-based waveguide that directs a transverse magnetic field mode of the electromagnetic wave to antennae of the internal components in order to induce an oscillating current within the internal components that serves as the clock signal.

BRIEF DESCRIPTION OF DRAWINGS

FIGS. 7A-7C illustrate three different snapshots, in time, of induced currents in a coiled sheet of a Swiss roll capacitor resulting from a propagating transverse magnetic field mode of an electromagnetic wave.

FIGS. 8A-8E illustrate five of many different kinds of microstructure shapes that can be used to fabricate two-dimensional metamaterials.

FIGS. 15A-15E illustrate frequencies of a unit cell composed of the SRR microstructure shown in FIG. 8A, for various microstructure spacings.

DETAILED DESCRIPTION OF THE INVENTION

Various embodiments of the present invention are directed to global interconnects that employ metamaterial-based waveguides to distribute clock signals to internal components of an IC. An electromagnetic radiation source radiates electromagnetic waves of radiation. Metamaterial-based waveguides, composed of microstructures that confine and direct a transverse magnetic field mode having a frequency within a specific frequency range of the electromagnetic waves, are located near the internal components so that the transverse magnetic field mode transmitted through the waveguides from the electromagnetic radiation source can induce an oscillating current in antennae located on the internal components. The oscillating current induced in the antenna of an internal component serves as a clock signal that can be used to synchronize operation of each internal component.

The present invention is described below in the subsections: (1) metamaterials that interact with transverse magnetic field modes of electromagnetic waves, and (2) distributing clock signals using non-magnetic, capacitor-based metamaterials.

Figure 1A:
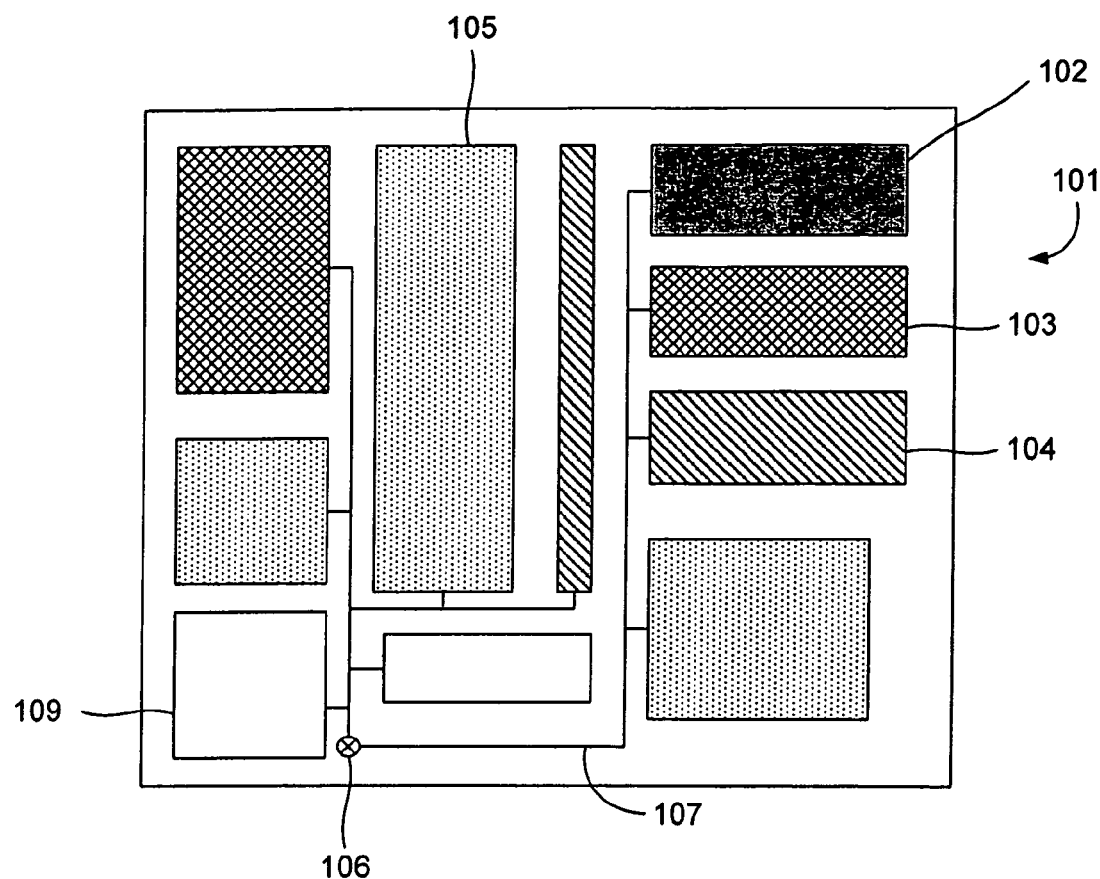
FIGS. 1A-1B illustrate an exemplary global interconnect that distributes a clock signal to numerous internal components of a hypothetical integrated circuit.
Figure 1B:
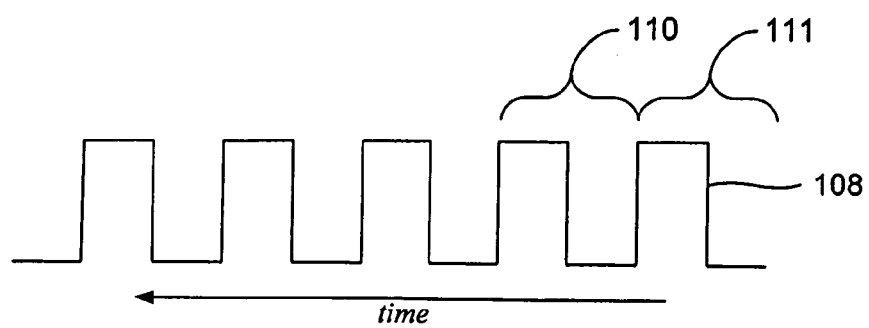
Figure 2:
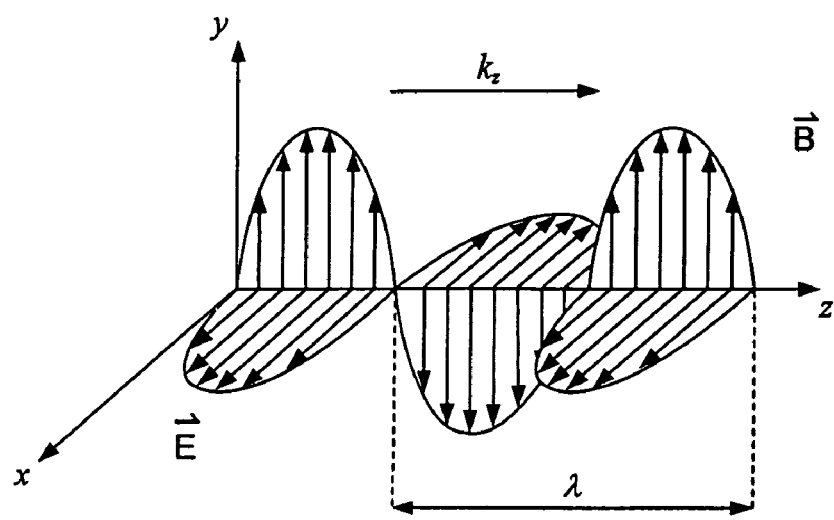
FIG. 2 illustrates an exemplary transverse electric field mode and an exemplary transverse magnetic field mode of an electromagnetic wave propagating in free space.

Metamaterials that Interact with Transverse Magnetic Field Modes of Electromagnetic Waves Electromagnetic radiation propagating in free space can be characterized by electromagnetic waves that consist of oscillating electric field, $\vec{E}$, modes ("TE") and corresponding magnetic field, $\vec{B}$, modes ("TM") that are orthogonal to one another and transverse to the direction of propagation of the electromagnetic waves. FIG. 2 illustrates an exemplary TE and an exemplary TM of an electromagnetic wave propagating in free space. In FIG. 2, the electromagnetic wave propagates in the z-direction, as indicated by wavevector $k_z$, with a wavelength $\lambda$ at the speed of light c. In general, for each TE of a propagating electromagnetic wave, there is a corresponding orthogonally directed TM. For example, in FIG. 2, a TE lying in the xz-plane has a corresponding orthogonal TM lying in the yz-plane.

Electromagnetic waves propagate in various kinds of materials when the wavelengths of the TEs and TMs are longer than the internal structure of the atoms or molecules comprising the materials. As a result, heterogeneous atomic structural details of a material can conceptually be replaced with a homogeneous material characterized by two macroscopic electromagnetic parameters, electric permittivity, $\epsilon_0$, and magnetic permeability, $\mu_0$. The electric permittivity $\epsilon_0$ and magnetic permeability $\mu_0$ relate the electric and magnetic field modes of an electromagnetic wave propagating in free space to an electric displacement field, $\vec{D}$, mode and a magnetic field, $\vec{H}$, mode for an electromagnetic wave propagating in a material as follows:

$$\vec{B} = \mu_0 \vec{H}$$
$$\vec{E} = \frac{1}{\varepsilon_0} \vec{D}$$

The electric permittivity $\epsilon_0$ represents the ability of a material to store electrical potential energy under the influence of an electric field, and the magnetic permeability $\mu_0$ represents the degree to which a material can modify the flux of a magnetic field.

Figure 3:
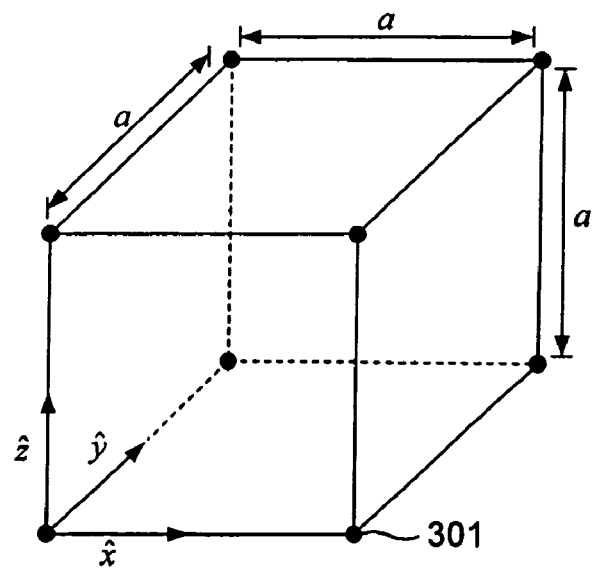
FIG. 3 illustrates a cubic unit cell for a three-dimensional lattice of objects comprising a metamaterial.

The parameters $\epsilon_0$ and $\mu_0$ can be characterized for any material fabricated from a collection of objects having sizes and spacings that are much smaller than the wavelength $\lambda$. In other words, the wavelength $\lambda$ can be used to determine whether a material fabricated from a collection of objects can be considered a homogeneous or heterogeneous material. Metamaterials are artificial materials that are fabricated from a collection of microscale objects that are larger than atoms and molecules. The microscale objects comprising a metamaterial can be arranged in a regular lattice identified by the simplest repeating unit called a "unit cell." For example, a metamaterial unit cell can be body-centered cubic, face-centered cubic, or cubic, just to name a few. FIG. 3 illustrates a cubic unit cell for a three-dimensional lattice of microscale objects comprising a metamaterial. In FIG. 3, the microscale objects comprising a metamaterial are identified by closed circles located at the corners of the unit cell, such as closed circle 301. The constant a represents the space separating the objects. When the space between objects of a unit cell satisfies the wavelength condition:

$$a \ll \lambda = \frac{2\pi c}{\omega},$$

where ω is an angular frequency of a propagating electromagnetic wave, the metamaterial can be characterized as a homogeneous material and the electromagnetic waves propagating through the metamaterial are not effected by the internal structure of the metamaterial. However, when the wavelength condition is not satisfied, the internal structure of the metamaterial can diffract as well as refract propagating electromagnetic waves.

The objects used to fabricate metamaterials can be non-magnetic conductors called "microstructures," that, depending on the structure, dimensions, and arrangement of the microstructures, can affect the TMs of propagating electromagnetic waves, even though the dimensions of the metamaterial unit cell and the size of the microstructures satisfy the wavelength condition above. As a result, metamaterials composed of microstructures have an associated effective permeability parameter, $\mu_{eff}$, that relates the average free space TMs to the average TMs for an electromagnetic wave propagating in a metamaterial of microstructures, as follows:

$$\vec{B}_{ave} = \mu_{eff}\mu_0 \vec{H}_{ave}$$

$\vec{B}_{ave}$ is the magnetic field averaged over local variations in the TMs. When the effective permeability $\mu_{eff}$ is greater than zero, the microstructures have little to no effect on the TMs of an electromagnetic wave propagating in a metamaterial. However, metamaterials can be fabricated with microstructures having dimensions and arrangements that result in an effective permeability $\mu_{eff}$ with a negative value even though the wavelength condition is satisfied. As a result, certain metamaterials can be used to confine and direct the propagation of TMs of electromagnetic waves.

The effective permeability $\mu_{eff}$ of a metamaterial of microstructures can be determined by first determining the average free space $\vec{B}_{ave}$ and metamaterial $\vec{H}_{ave}$ fields and then solving for $\mu_{eff}$. The average fields can be determined for a unit cell, such as the cubic unit cell described above with reference to FIG. 3, using Maxwell's curl equations in integral form:

$$\int_C \vec{H} \cdot d\vec{l} = \frac{\partial}{\partial t}\int_S \vec{D} \cdot d\vec{S}$$

$$\int_C \vec{E} \cdot d\vec{l} = -\frac{\partial}{\partial t}\int_S \vec{B} \cdot d\vec{S}$$

where t is time, and
C is a loop that encloses a surface area S of a face of the unit cell.

The components of $\vec{H}_{ave}$ are determined by averaging the $\vec{H}$ field along each of the three axes of the unit cell. For example, for the cubic unit cell shown in FIG. 3, the components of $\vec{H}_{ave}$ are determined by:

$$(H_{ave})_x = \frac{1}{a}\int_{(0,0,0)}^{(a,0,0)} \vec{H} \cdot d\vec{r}$$

$$(H_{ave})_y = \frac{1}{a}\int_{(0,0,0)}^{(0,a,0)} \vec{H} \cdot d\vec{r}$$

$$(H_{ave})_z = \frac{1}{a}\int_{(0,0,0)}^{(0,0,a)} \vec{H} \cdot d\vec{r}$$

The edges of a unit cell do not intersect with the microstructures located at the corners of the unit cell. As a result, parallel components of $\vec{H}_{ave}$ are continuous across the surface of the metamaterial.

The components of $\vec{B}_{ave}$ are determined by averaging the $\vec{B}$ field over three faces of the unit cell. For example, for the cubic unit cell shown in FIG. 3, the components of $\vec{B}_{ave}$ are determined by:

$$(B_{ave})_x = \frac{1}{a^2}\int_{S_x} \vec{B} \cdot d\vec{S}$$

$$(B_{ave})_y = \frac{1}{a^2}\int_{S_y} \vec{B} \cdot d\vec{S}$$

$$(B_{ave})_z = \frac{1}{a^2}\int_{S_z} \vec{B} \cdot d\vec{S}$$

where $S_x$, $S_y$, $S_z$ are surfaces of the unit cell defined by vector pairs ŷ and ẑ, x̂ and ẑ, and x̂ and ŷ, respectively.

After the components of the average $\vec{H}_{ave}$ and average $\vec{B}_{ave}$ have been determined, the effective permeability is given by:

$$\mu_{eff} = \mu_0 \frac{\vec{H}_{ave}}{\vec{B}_{ave}}$$

Figure 4:
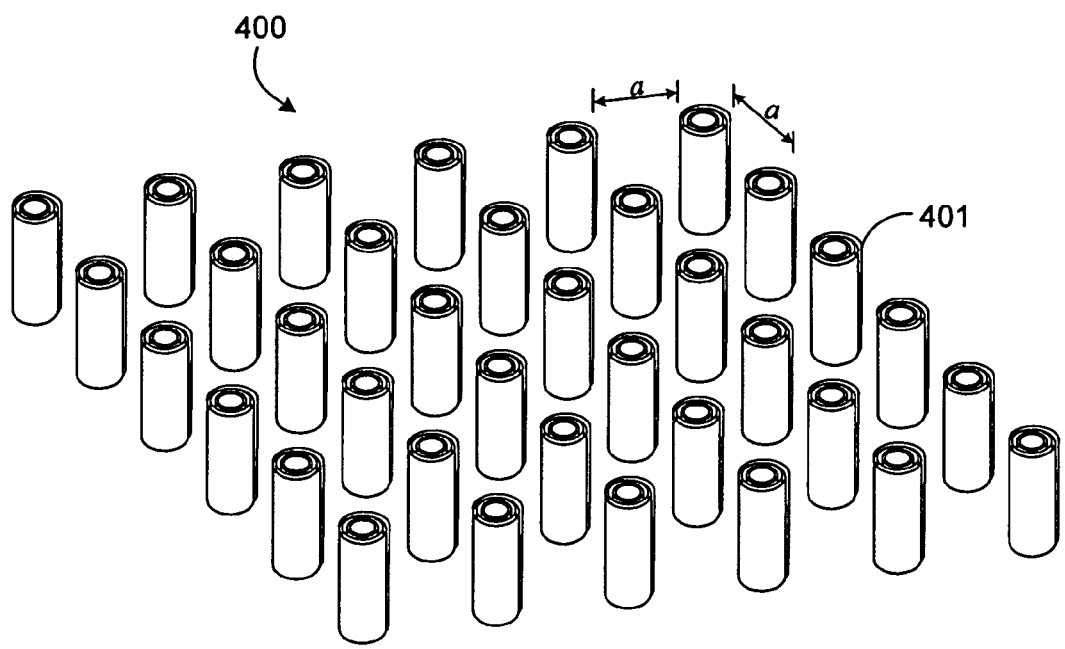
FIG. 4 illustrates a metamaterial composed of a two-dimensional square lattice of microstructures.
Figure 5:
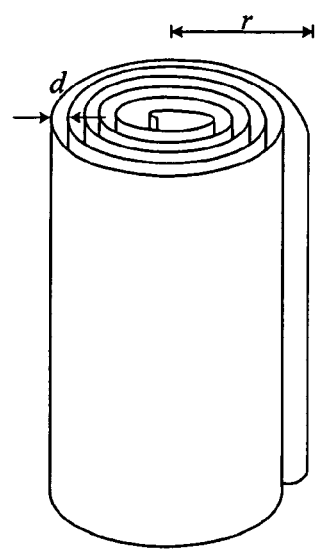
FIG. 5 illustrates a Swiss roll capacitor.

Metamaterials can be identified by the number of directions in which the microstructures are periodic. For example, a planar lattice of microstructures that are periodic in two directions comprises a two-dimensional metamaterial. FIG. 4 illustrates a metamaterial 400 comprising a two-dimensional square lattice of microstructures. In FIG. 4, each microstructure, such as microstructure 401, is a coiled, non-magnetic, conductive metallic sheet that forms a cylindrical capacitor called a "Swiss roll." The unit cell of metamaterial 400 is a square planar lattice of four Swiss rolls having spacing a. FIG. 5 illustrates an enlargement of one of the Swiss rolls shown in FIG. 4. Each Swiss roll has a radius r and a distance d separating each coil.

The effect a metamaterial comprising Swiss rolls can have on the TM of electromagnetic waves depends on the radius r, the distance d, the spacing a, and the number of coils N, as indicated by the functional form of the effective permeability for a a square unit cell of Swiss rolls given by:

$$\mu_{eff} = 1 - \frac{\frac{\pi r^2}{a^2}}{1 + \frac{2\sigma i}{\omega r \mu_0 (N-1)} - \frac{dc^2}{2\pi^2 r^3 (N-1) \omega^2}}$$

where σ is the resistance of the coiled sheets,
i is $\sqrt{-1}$, and
ω is the angular frequency of electromagnetic radiation applied to the metamaterial.

Figure 6:
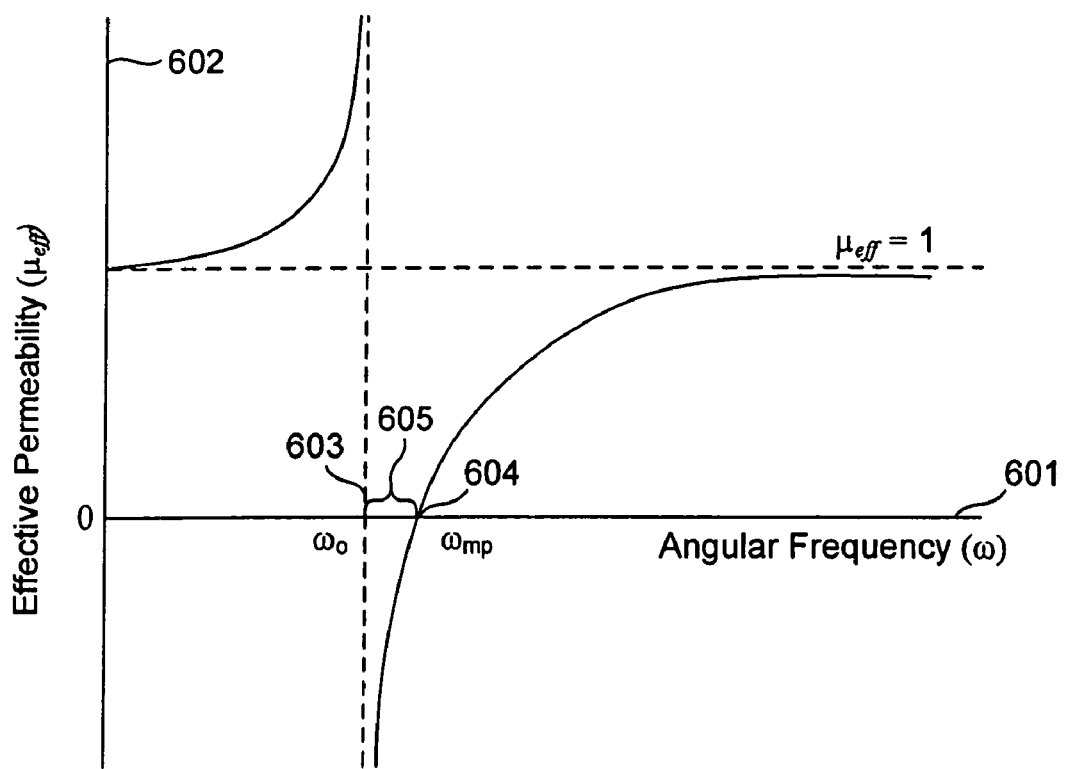
FIG. 6 is a plot of Re ($\mu_{eff}$) versus angular frequency for a square unit cell of Swiss roll capacitors.

FIG. 6 is a plot of Re($\mu_{eff}$) versus angular frequency ω for a square unit cell of Swiss rolls. In FIG. 6, horizontal line 601 is the angular frequency axis, and vertical line 602 is the effective permeability axis. Point 603 identifies the frequency at which $\mu_{eff}$ diverges and is given by:

$$\omega_0 = \sqrt{\frac{dc^2}{2\pi^2 r^3 (N-1)}}$$

Point 604 identifies a magnetic plasma frequency given by:

$$\omega_{mp} = \sqrt{\frac{dc^2}{\left(1 - \frac{\pi r^2}{a^2}\right) 2\omega^2 r^3 (N-1)}}$$

Magnetic plasma frequency $\omega_{mp}$ identifies a lower limit for a range of frequencies above which the TMs of electromagnetic waves do not interact appreciably with the Swiss rolls of metamaterial 400 shown in FIG. 4. In contrast, the TMs of electromagnetic waves having frequencies in passband 605 interact strongly with the Swiss rolls by inducing a resonating current j on the coiled sheet of each Swiss roll. The passband 605, shown in FIG. 6, can be shifted along axis 601 to higher or lower frequencies by adjusting the distance d, the radius r, the spacing a, and the number of coils N.

In general, a changing magnetic field applied to a conductor induces an electric current that flows in the conductor. A changing magnetic field that induces a current in the coiled sheets of a Swiss roll can be an oscillating TM of an electromagnetic wave with a frequency that lies in the passband. FIGS. 7A-7C conceptually illustrate three different snapshots, in time, of induced currents in a coiled sheet of a Swiss roll resulting from a TM of a propagating electromagnetic wave. In FIGS. 7A-7C, electromagnetic radiation is directed perpendicular to the central axis of Swiss roll 701, as indicated by wavevector $\vec{k}$ 702. FIG. 7A shows a maximum upward displacement 703 of a propagating TM located directly over the central axis of Swiss roll 701. In Swiss roll top view 705, the upward displacement of the TM creates a capacitance between inner coil turn 706 and outer coil turn 707 that enables current j to flow in the direction identified by arrow 704. FIG. 7B shows an inflection point 708 of a TM located directly over the central axis of Swiss roll 701. As a result, in Swiss roll top view 709, no capacitance is created between inner coil turn 706 and outer coil turn 707 and no current is induced in the coiled sheet of Swiss roll 701. FIG. 7C shows a maximum downward displacement 710 of a TM located directly over the central axis of Swiss roll 701. In Swiss roll top view 712, the downward displacement creates a capacitance between inner coil turn 706 and outer coil turn 707 that enables current j to flow in the direction identified by arrow 711, which is opposite the direction of the current induced by upward displace of the TM, as indicated by arrow 704.

The direction of the induced current in Swiss roll 701 continuously oscillates with the upward and downward oscillating displacement of a propagating TM. However, a wave corresponding to the continuously oscillating current j is phase shifted and lags behind the propagating TM wave.

The Swiss roll microstructures described above with reference to FIGS. 4-7C represent just one of many different microstructure shapes that can be used to fabricate two-dimensional metamaterials. For example, FIGS. 8A-8E illustrate five of many different kinds of microstructure shapes that can be used to fabricate two-dimensional metamaterials. The microstructures shown in FIGS. 8A-8E are referred to as "split ring resonators" ("SRR").

Figure 9:
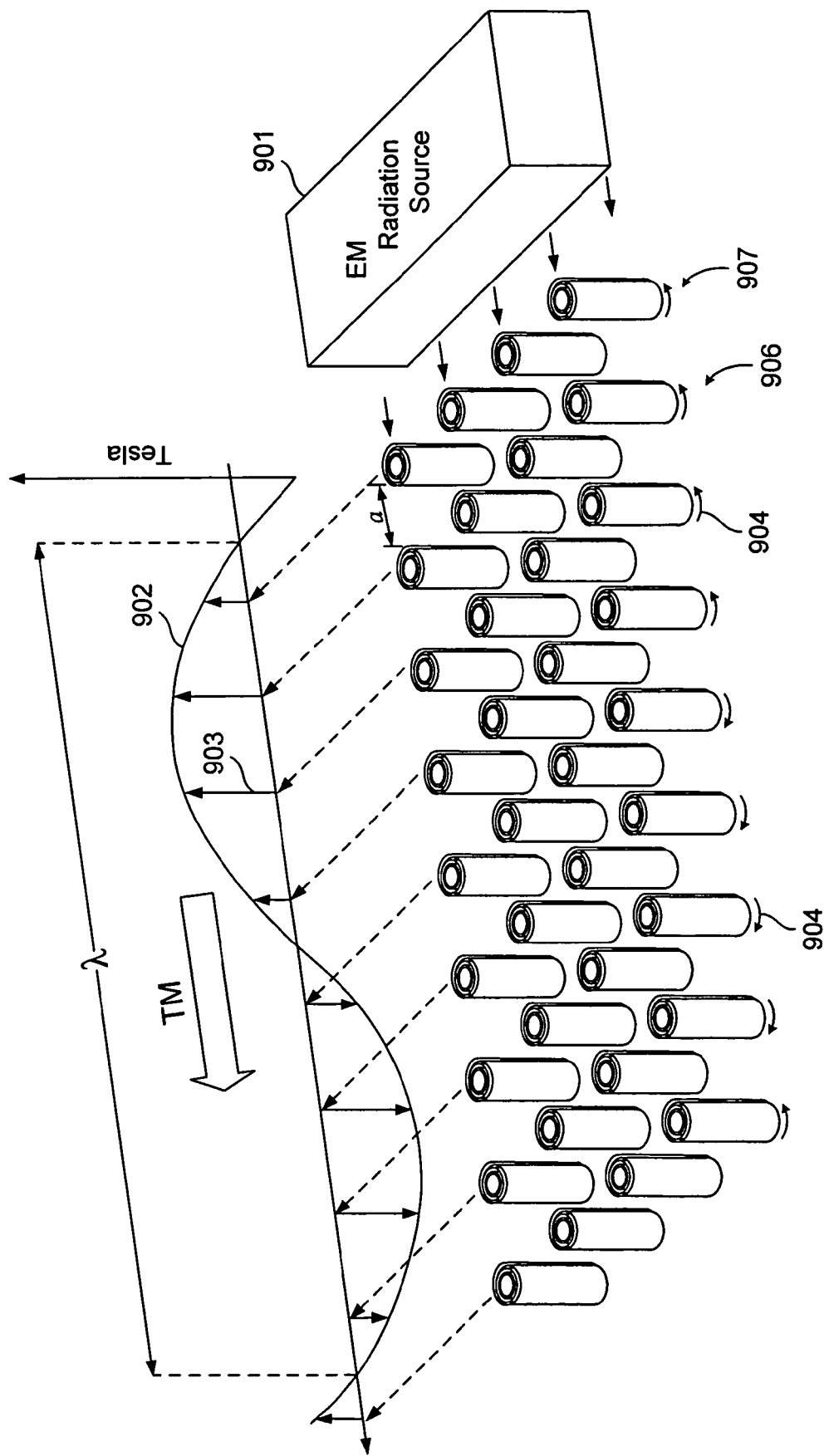
FIG. 9 illustrates a propagating transverse magnetic field mode of an electromagnetic wave that is confined to the plane of a metamaterial composed of Swiss roll capacitors.

A propagating TM of an electromagnetic wave having frequencies in the passband can be confined to the plane of a two-dimensional metamaterial. FIG. 9 illustrates a propagating TM of an electromagnetic wave that is confined to the plane of a metamaterial composed of Swiss rolls. In FIG. 9, the electromagnetic waves originate from an electromagnetic radiation source 901 located at one end of the metamaterial. The wavelength λ of TM 902 of electromagnetic wave propagating across the metamaterial is longer than the spacing a between Swiss rolls The upward and downward displacement of the propagating TM identified by directional arrows, such as directional arrow 903, induces currents in coils of the Swiss rolls that flow in the directions identified by directional arrows 904 and 905. The amount of current induced in the coils of the Swiss rolls is proportional to the amount of upward and downward displacement of the propagating TM. For example, the upward displacement of the TM propagating over row 906 is larger than the upward displacement of the same TM propagating over row 907. As a result, the magnitude of the lagging current induced in the Swiss rolls of row 906 is larger than the magnitude of the lagging current induced in the Swiss rolls of row 907.

Distributing Clock Signals Using Metamaterial-based Waveguides

Figure 10:
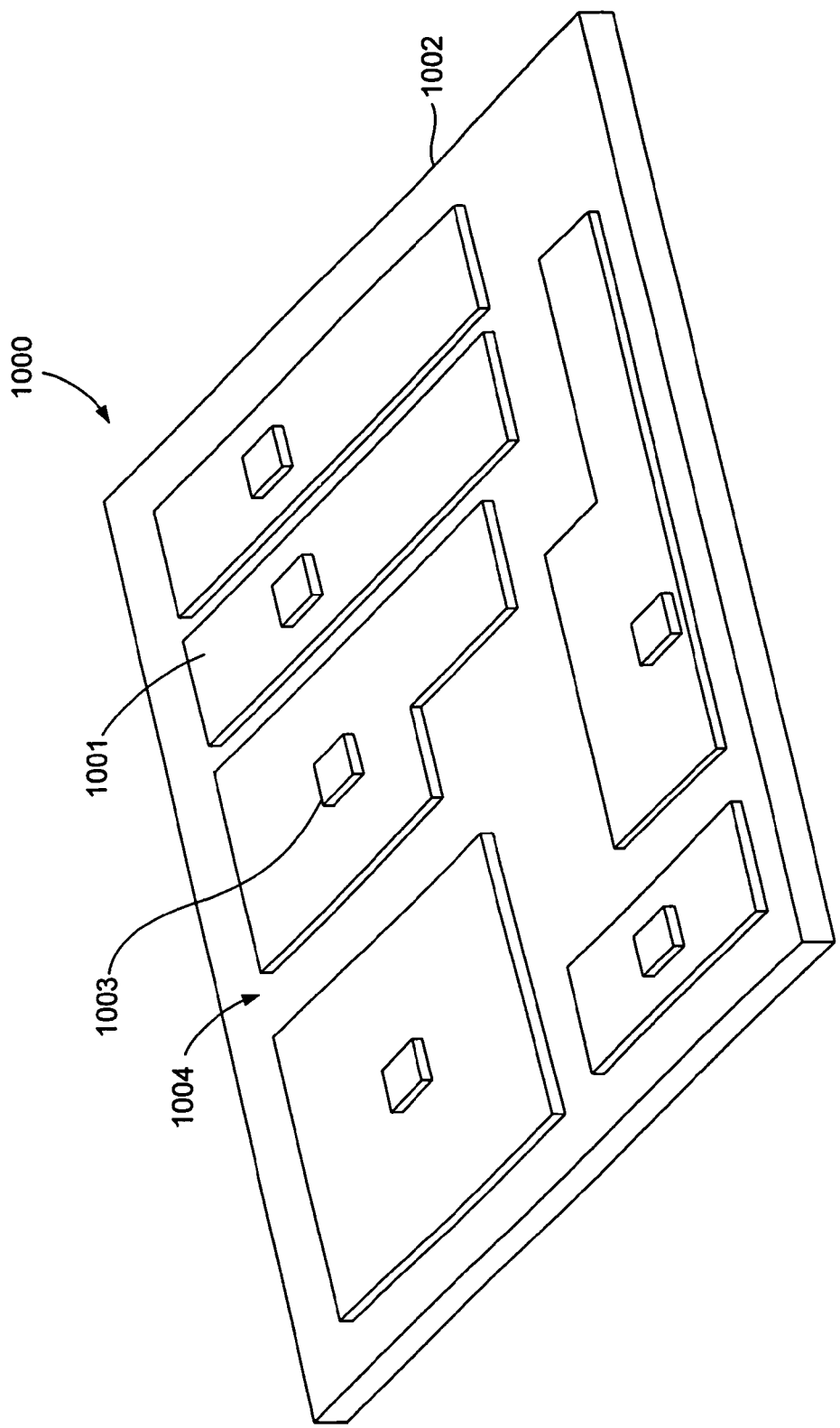
FIG. 10 illustrates a perspective view of an exemplary integrated circuit with internal components having antennae for receiving a clock signal in the form of a transverse magnetic field mode of an electromagnetic wave representing one of many possible embodiments of the present invention.

FIG. 10 illustrates a perspective view of an exemplary IC 1000 with internal components having antennae for receiving a clock signal in the form of a TM of an electromagnetic wave representing one of many possible embodiments of the present invention. In FIG. 10, internal components of IC 1000 are represented by raised surfaces, such as raised surface 1001, that are attached to substrate 1002. The internal components can be processing units, logic circuits, or local memory units. Each internal component includes an antenna represented by a box, such as box 1003, located on the top surface of each internal component. The antennae are composed of non-magnetic, conducting materials. The regions between internal components, such as region 1004, may include a global interconnect composed of a network of signal lines and address lines for distributing data, power, and addresses to each internal component.

Figure 11:
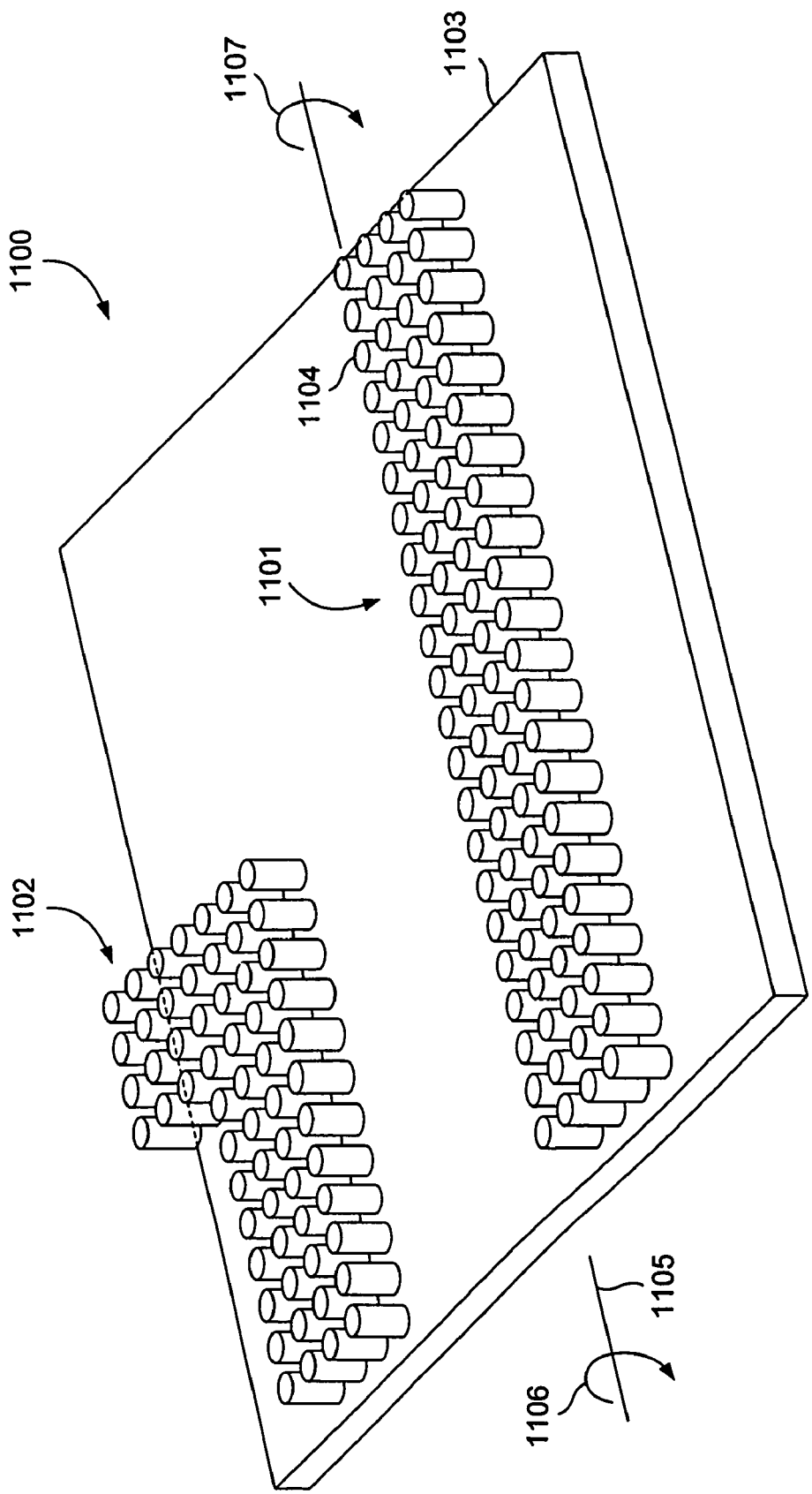
FIG. 11 illustrates a perspective view of an exemplary global interconnect for distributing a clock signal in the form of a transverse magnetic field mode to the internal components of the integrated circuit, shown in FIG. 10, representing one of many possible embodiments of the present invention.

A clock signal in the form a TM can be distributed to each internal component of IC 1000 using two-dimensional metamaterial-based waveguides. FIG. 11 illustrates a perspective view of an exemplary global interconnect 1100 for distributing a clock signal in the form of a TM to the internal components of the IC 1000 representing one of many possible embodiments of the present invention. In FIG. 11, waveguides 1101 and 1102 are two-dimensional metamaterials composed of a square unit cell lattice of microstructures that are located on the top surface of substrate 1103. Each waveguide is four microstructures wide. The microstructures are represented by cylinders, such as cylinder 1104, and can be Swiss rolls, described above with reference to FIG. 5, or SRRs, such as any of the SRRs shown in FIGS. 8A-8E. The microstructures can be fabricated on substrate 1102 using lithographic methods that are well-know in the art.

Figure 12:
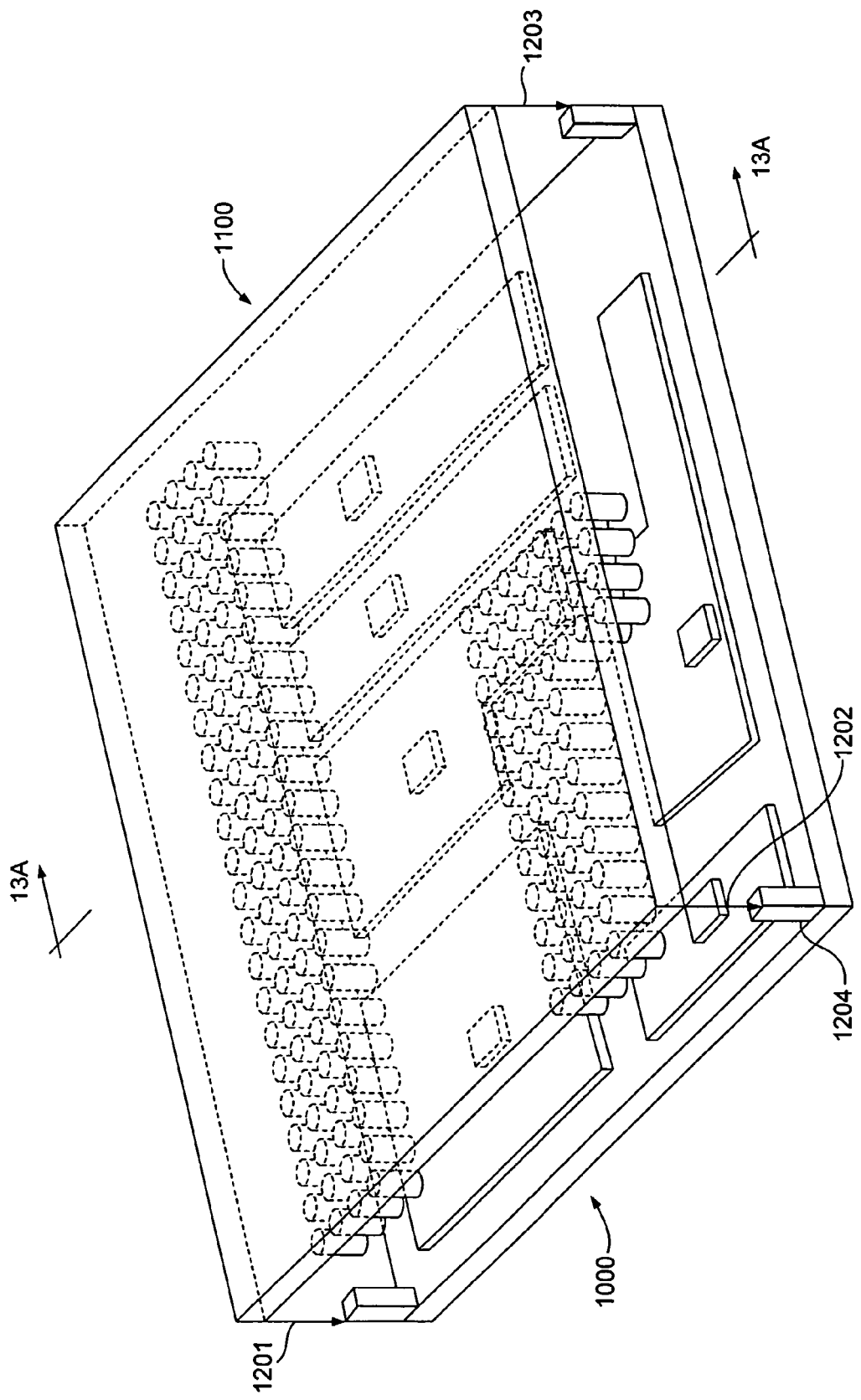
FIG. 12 illustrates an inverted global interconnect, shown in FIG. 11, positioned directly above the integrated circuit, shown in FIG. 10, representing one of many possible embodiments of the present invention.

In order to distribute a TM to the internal components of the IC 1000, global interconnect 1100 can be inverted and positioned directly above IC 1000. FIG. 12 illustrates inverted global interconnect 1100 positioned directly above the IC 1000 representing one of many possible embodiments of the present invention. Inverted global interconnect 1100 is lowered, as indicated by directional arrows 1201-1203, and suspended above IC 1000 by supports located at the corners of IC 1000, such as support 1204. The supports prevent the microstructures of waveguides 1101 and 1102 from contacting the antennae located on the top surface of each internal component.

Figure 13A:
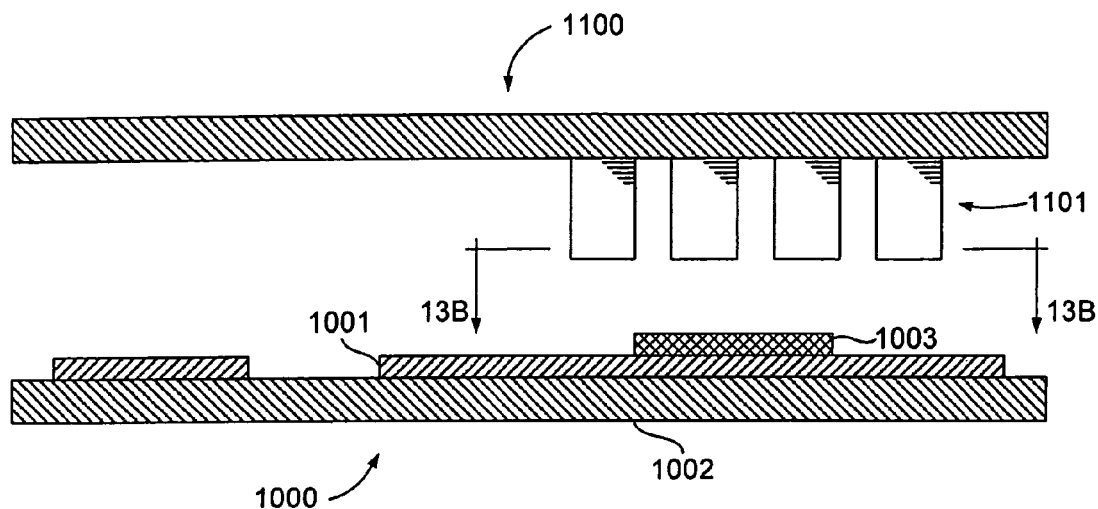
FIG. 13A illustrates a cross-sectional view of the integrated circuit and global interconnect shown in FIG. 12, taken along the line 13A-13A, that represents one of many embodiments of the present invention.
Figure 13B:
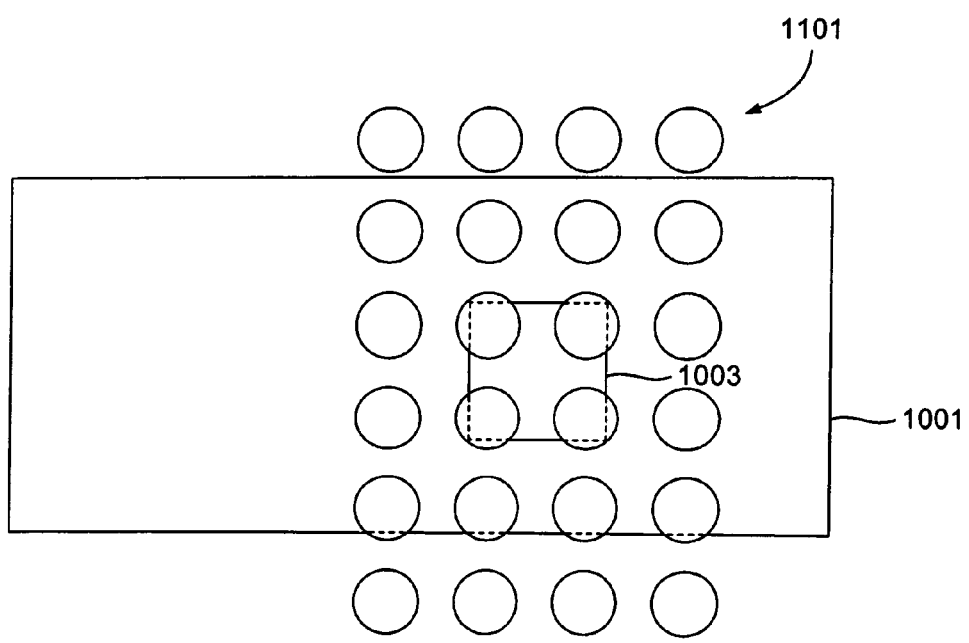
FIG. 13B illustrates a cross-sectional view of the waveguide shown in FIG. 13A, taken along the line 13B-13B, that represents one of many embodiments of the present invention.

FIG. 13A illustrates a cross-sectional view of the IC and global interconnect shown in FIG. 12, that represents one of many embodiments of the present invention. In FIG. 13A, global interconnect 1100 is suspended above IC 1000 by supports shown in FIG. 12. Antenna 1003 is located on the top surface of internal component 1001, and waveguide 1101 is located directly above antenna 1003. An oscillating TM in waveguide 1101 induces an oscillating current in antenna 1003. The induced current oscillates at the same rate as the TM propagating in waveguide 1101 and is used as a clock signal to synchronize the operation of internal component 1001 with the remaining internal components of IC 1000. FIG. 13B illustrates a cross-sectional view of the waveguide shown in FIG. 13A. In FIG. 13B, antenna 1003 is located directly below the microstructures of waveguide 1101.

Figure 14A:
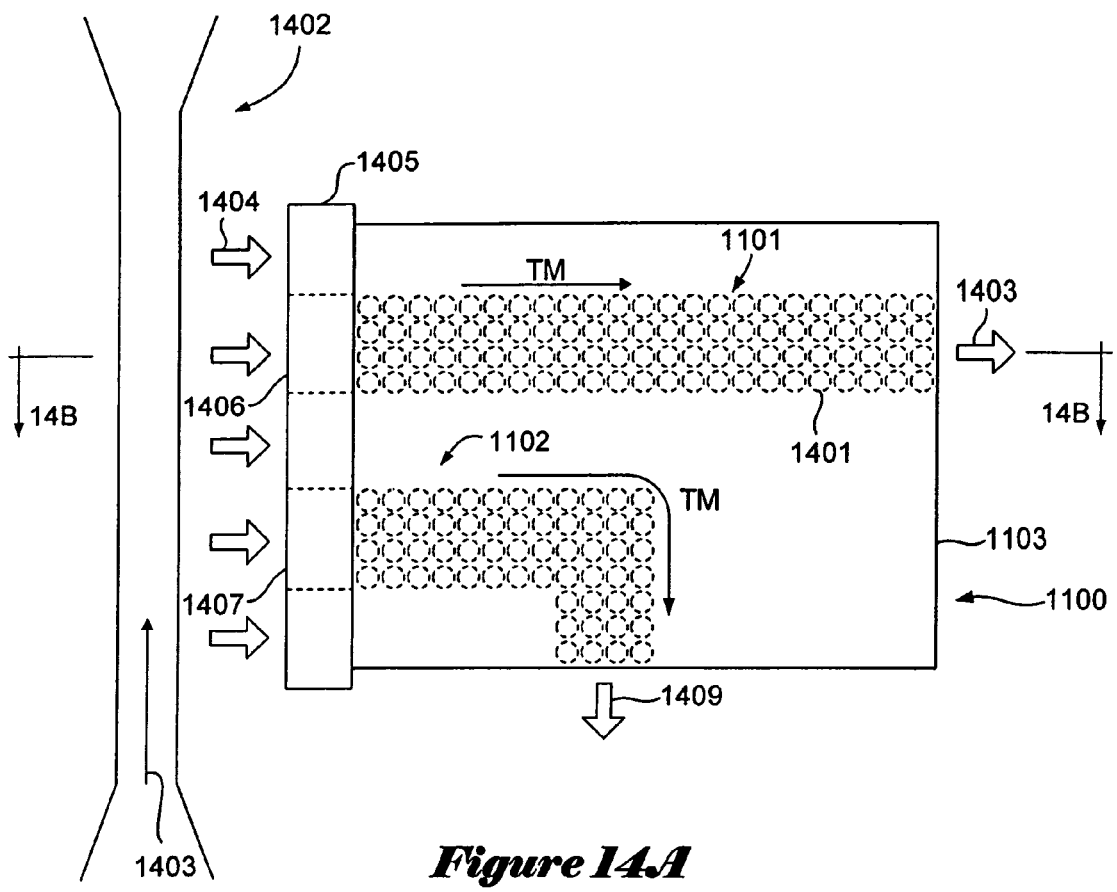
FIG. 14A illustrates a top view of a tapered optical fiber located along an edge of the inverted global interconnect and integrated circuit shown in FIG. 12, that represents one of many possible embodiments of the present invention.

A tapered optical fiber or tapered coaxial cable can be used to transmit the TM of an electromagnetic wave into the metamaterial-based waveguides. A fraction of the electromagnetic waves propagating parallel to the central axis of a tapered optical fiber or tapered coaxial cable evanesces in all directions perpendicular to the central axis of the optical fiber or coaxial cable. The evanesced electromagnetic waves provide the TMs that propagate in the waveguides of the global interconnect described above with reference to FIGS. 11 and 12. FIG. 14A illustrates a top view of a tapered optical fiber located along an edge of the inverted global interconnect and integrated circuit shown in FIG. 12 representing one of many possible embodiments of the present invention. In FIG. 14A, global interconnect 1100 is located above IC 1000. Dashed line circles, such as dashed line circle 1401, identify the microstructures comprising waveguides 1101 and 1102 and located on the underside of substrate 1103. Tapered optical fiber 1402 transmits electromagnetic waves in the direction indicated by directional arrow 1403. Directional arrows, such as directional arrow 1404, represent a fraction of the propagating electromagnetic waves evanescing from optical fiber 1402 toward global interconnect 1100. Filter 1405 includes slits 1406 and 1407 that selectively permit only the evanescing electromagnetic waves that propagate parallel to waveguides 1101 and 1102 to enter waveguides 1101 and 1102 and prevents other evanescing electromagnetic waves directed outward from tapered optical fiber 1402 from interacting with IC 1000. The microstructures of waveguides 1101 and 1102 transmit the TMs of the evanescing electromagnetic waves having frequencies that lie within the passband of the microstructure square unit cell to the end of each waveguide, as indicated by directional arrows 1408 and 1409.

Figure 14B:
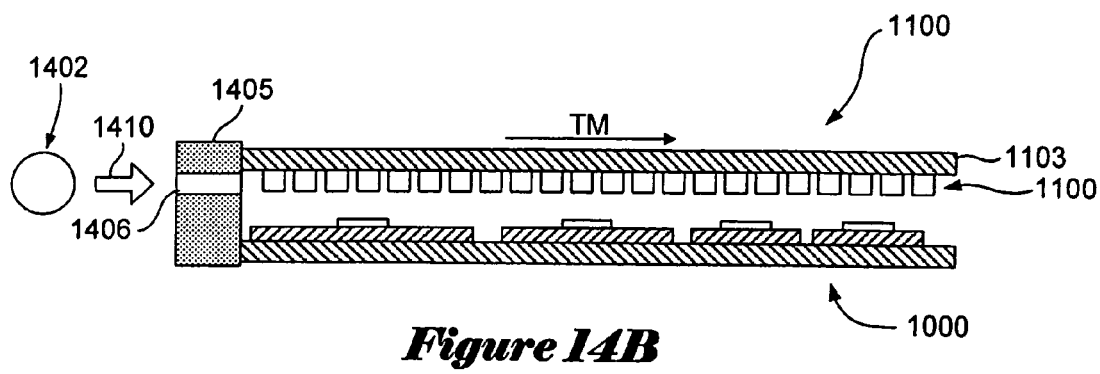
FIG. 14B illustrates a cross-sectional view of the tapered optical fiber and integrated circuit shown in FIG. 14A, taken along the line 14B-14B, that represents one of many embodiments of the present invention.

FIG. 14B illustrates a cross-sectional view of the tapered optical fiber and IC shown in FIG. 14A, that represents one of many embodiments of the present invention. In FIG. 14B, an evanescing electromagnetic wave identified by directional arrow 1410 enters slit 1406 in filter 1405. The TM of the electromagnetic wave is transmitted by waveguide 1101. The oscillation in the TM induces a current in the antennae located below waveguide 1101, such as antenna 1411, that oscillates with the same frequency of the TM. The oscillating current in each antenna is the clock signal that synchronizes the operation of internal components of IC 1000.

Metamaterial-based waveguides can be used to transmit TMs with passband frequencies that lie within the gigahertz ("GHz") as well as terahertz ("THz") frequency ranges. Table 1 displays limits of two passbands for two square unit cells, each comprising two differently dimensioned Swiss rolls as follows:

TABLE 1

| d | r | a | N | $f_0 = \omega_0/2\pi$ | $f_{mp} = \omega_{mp}/2\pi$ |
|---|---|---|---|---|---|
| 10 μm | 200 μm | 500 μm | 3 | 8.5 GHz | 12 GHz |
| 50 nm | 300 nm | 750 nm | 3 | 100 THz | 160 THz |

The frequencies listed in Table 1 indicate that the range of frequencies within the passband increase as the dimensions of the Swiss rolls of a metamaterial decrease. In addition, the frequency data displayed in Table 1 indicates that metamaterial-based waveguides composed of Swiss rolls may be used to achieve GHz as well as THz clock rates.

SRRs, such as the SRRs shown in FIGS. 8A-8E, can also be employed as the microstructures of metamaterial-based waveguides to achieve GHz as well as THz clock rates. FIGS. 15A-15E illustrate frequencies of a square unit cell composed of the SRR microstructure shown in FIG. 8C, for various microstructure spacings. FIG. 15A illustrates a square unit cell of a metamaterial comprising the SRR shown in FIG. 8C. In FIG. 15A, the SRRs are spaced by a distance a. FIG. 15B illustrates an enlargement of one of the SRRs shown in FIG. 15A, with the slot length and inner and outer ring distance denoted by s, the wall thickness is denoted by t, and the length of each side is denoted by m. FIG. 15C displays magnetic plasma frequencies of the square unit cell shown in FIG. 15A for various unit cell spacings a with s equal 70 nm, t equal to 100 nm, m equal to 400 nm, and an SRR height equal to 20 nm. FIG. 15D is a plot of the magnetic plasma frequencies versus the first 10 lattice spacings displayed in FIG. 15C and indicates that, as the unit cell spacing increases linearly, the corresponding frequencies within the passband decrease exponentially. FIG. 15E displays frequencies for even smaller unit cell spacings of the SRRs and indicates that metamaterial-based waveguides fabricated with lattice spacings between 150 nm to 600 nm transmit TMs of electromagnetic waves with frequencies that lie in the terahertz ("THz") frequency range. The frequencies displayed in FIGS. 15C and 15E indicate that clock rates ranging from 10 GHz to 170 THz may be achievable for metamaterial-based waveguides composed of the SRRs shown in FIG. 15B.

Figure 16A:
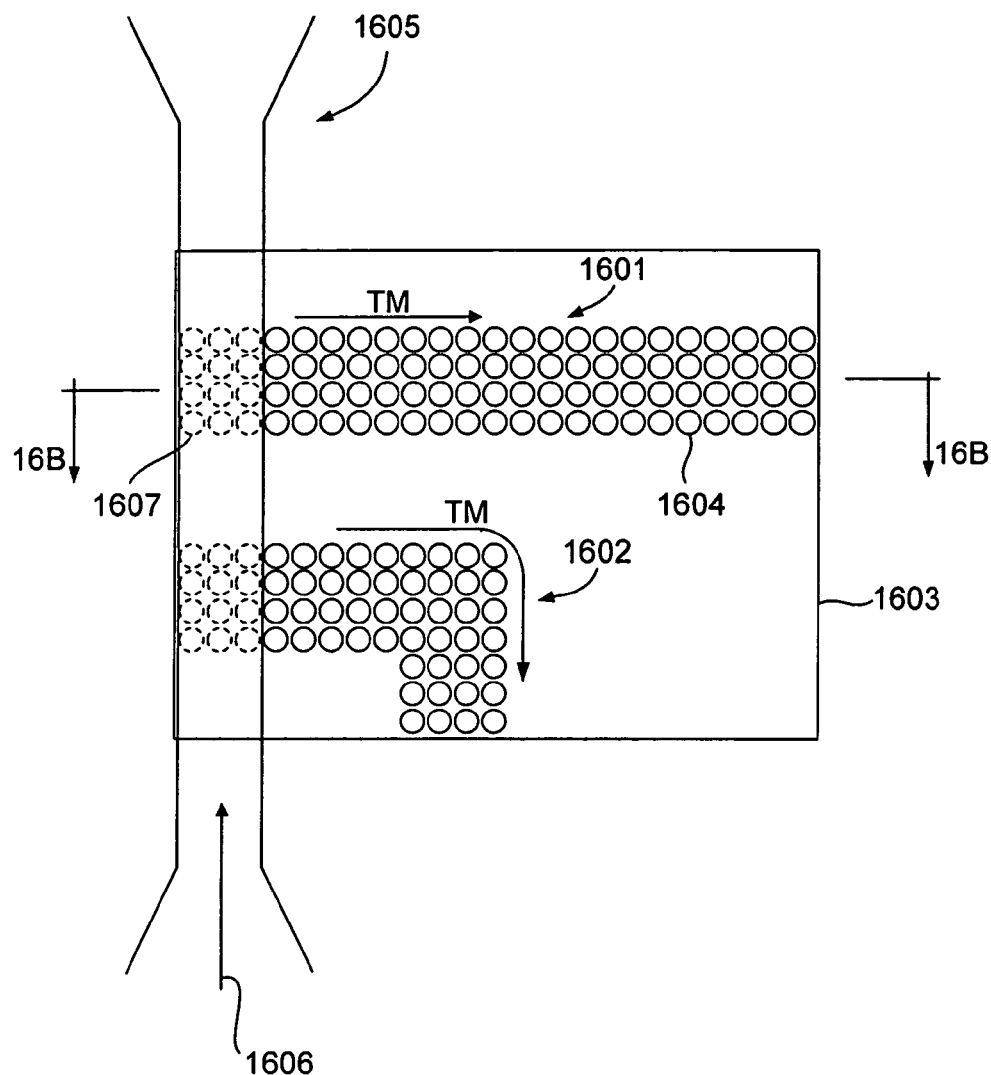
FIGS. 16A-16B illustrate a tapered optical fiber, located above a substrate with microstructures that extend above and below top and bottom surfaces of the substrate, that represents one of many possible embodiments of the present invention.
Figure 16B:
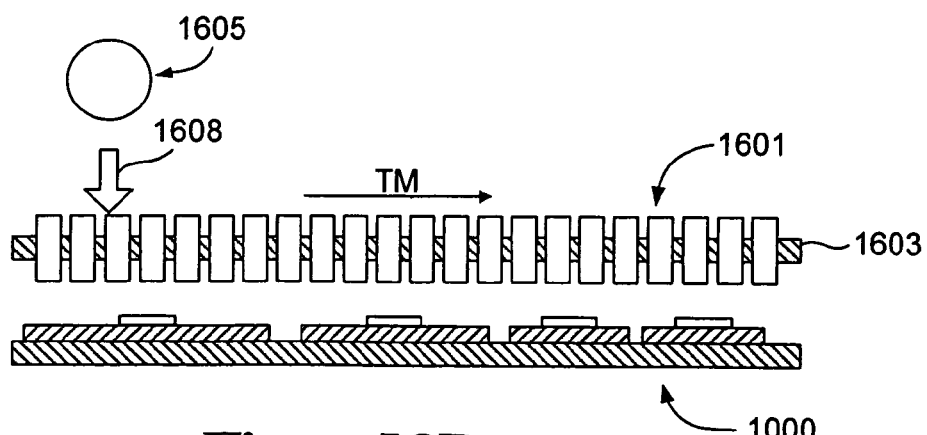

Although the present invention has been described in terms of a particular embodiment, it is not intended that the present invention be limited to this embodiment. Modifications within the spirit of the invention are apparent to those skilled in the art. For example, in an alternate embodiment of the present invention, the tapered optical fiber or coaxial cable used to deliver evanescent electromagnetic waves can be located above a substrate containing the metamaterial-based waveguides. In order to transmit a TM along the metamaterial-based waveguides, the microstructures are embedded in the substrate and extend above the top surface of the substrate and extend below the bottom surface of the substrate. FIGS. 16A-16B illustrate a tapered optical fiber located above a substrate with microstructures that extend above and below the substrate top and bottom surfaces, that represents one of many possible embodiments of the present invention. In FIG. 16A, the microstructures comprising waveguides 1601 and 1602 extend through substrate 1603 and are identified by circle 1604. IC 1000, shown in FIG. 10, is located beneath substrate 1603. Tapered optical fiber 1605 lies above substrate 1603 and transmits electromagnetic radiation perpendicular to waveguides 1601 and 1602 in the direction identified by directional arrow 1606. Hash-marked circles, such as hash-marked circle 1607, represent microstructure of waveguides 1601 and 1602 that extend above substrate 1603 and lie below tapered optical fiber 1605.

FIG. 16B illustrates a cross-sectional view of the tapered optical fiber and IC shown in FIG. 16A. In FIG. 16B, an evanescing electromagnetic wave identified by directional arrow 1608 induces oscillating currents in the microstructures located directly below tapered optical fiber 1605. The oscillating currents induce a TM that propagates on waveguide 1601. The oscillation in the TM induces an oscillating current in the antenna located below waveguide 1601 that oscillates with the same frequency as TM. The oscillating current in each antenna is the clock signal that synchronizes the operation of internal components of IC 1000.

Figure 17A:
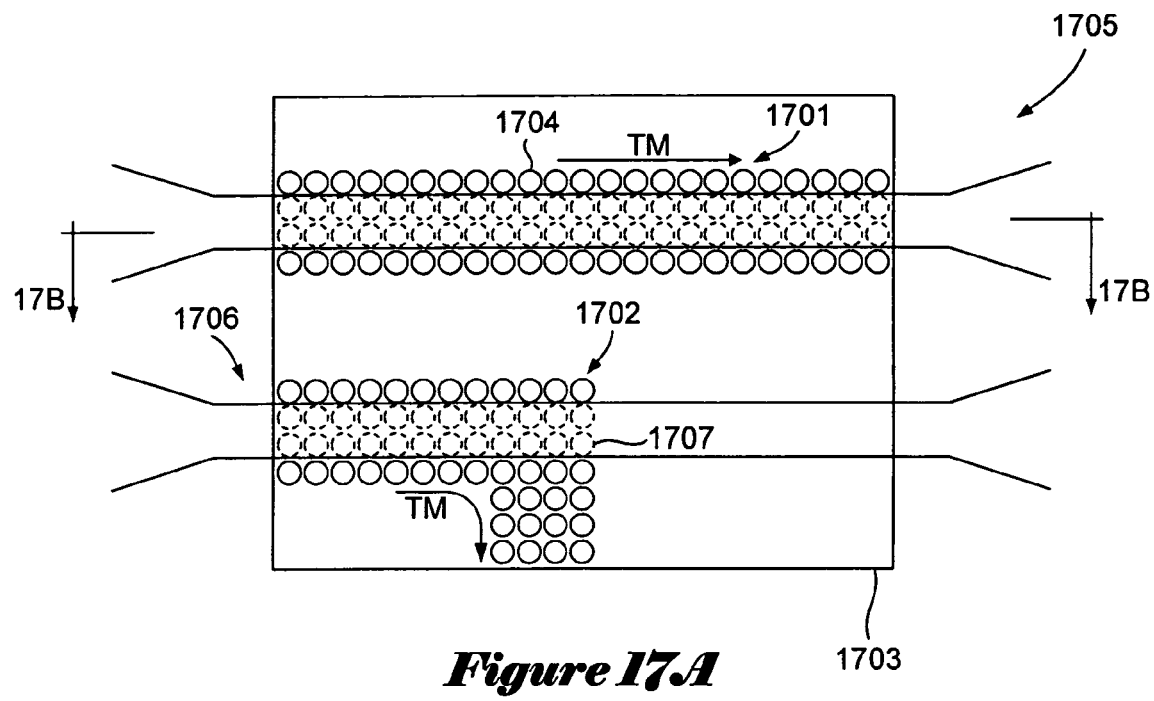
FIGS. 17A-17B illustrate two tapered optical fibers, located above a substrate with microstructures that extend above and below top and bottom surfaces of the substrate, that represents one of many possible embodiments of the present invention.
Figure 17B:
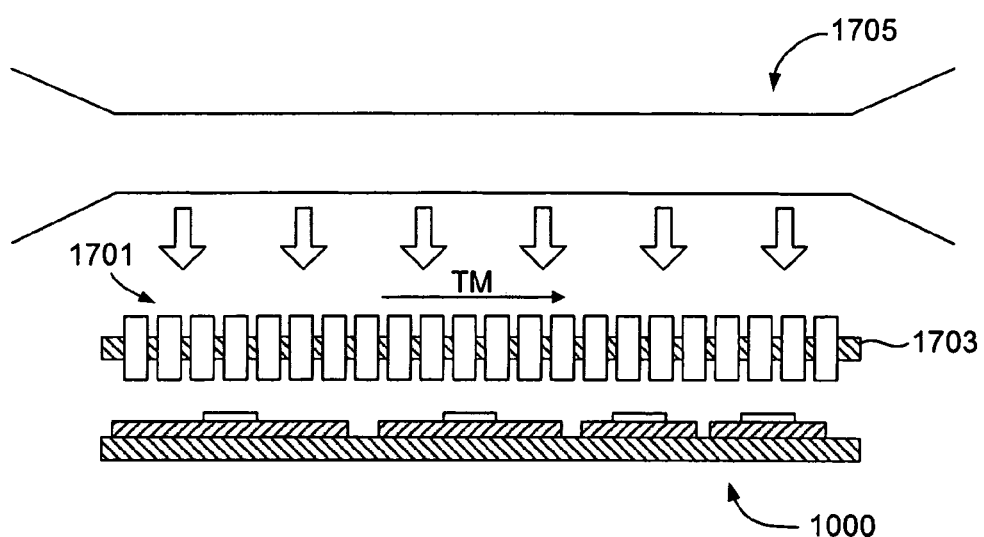

FIGS. 17A-17B illustrate two tapered optical fibers located above a substrate with microstructures that extend above and below the substrate top and bottom surfaces that represents one of many possible embodiments of the present invention. In FIG. 17A, the microstructures comprising waveguides 1701 and 1702 extend through substrate 1703 and are identified by circles, such as circle 1704. IC 1000, shown in FIG. 10, is located beneath substrate 1703. Tapered optical fibers 1705 and 1706 are suspended above substrate 1703 and transmit electromagnetic radiation parallel to waveguides 1701 and 1702. Hash-marked circles, such as hash-marked circle 1707, represent microstructure of waveguides 1701 and 1702 that extend above substrate 1703 and lie below tapered optical fibers 1705 and 1706.

FIG. 17B illustrates a cross-sectional view of the tapered optical fiber and IC shown in FIG. 17A. In FIG. 17B, a TM of an evanescing electromagnetic wave induces oscillating currents in the microstructures located directly below tapered optical fiber 1705. The oscillating currents induce a TM that propagates on waveguide 1701. The oscillation in the TM induces an oscillating current in the antennae located below waveguide 1701 that oscillates with the same frequency as TM. The oscillating current in each antenna is the clock signal that synchronizes the operation of internal components of IC 1000.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A global interconnect for distributing a clock signal to internal components of an integrated circuit, the global interconnect comprising:
    an electromagnetic radiation source that radiates electromagnetic waves; and
    a metamaterial-based waveguide that directs a transverse magnetic field mode of the electromagnetic wave to antennae of the internal components in order to induce an oscillating current within the internal components that serves as the clock signal.

2. The global interconnect of claim 1 wherein the electromagnetic radiation source further comprises a tapered optical fiber that transmits electromagnetic radiation.

3. The global interconnect of claim 1 wherein the electromagnetic radiation source further comprises a tapered coaxial cable that transmits electromagnetic radiation.

4. The global interconnect of claim 1 wherein the metamaterial-based waveguide further comprises a two-dimensional regular lattice of microstructures.

5. The global interconnect of claim 4 wherein the two-dimensional regular lattice of microstructures further comprises the microstructures located on a surface of a substrate.

6. The global interconnect of claim 4 wherein the two-dimensional regular lattice of microstructures further comprises the microstructures embedded within a substrate.

7. The global interconnect of claim 6 wherein the microstructures embedded within the substrate further comprises the microstructures extending above the top surface of the substrate and the microstructures extending below the bottom surface of the substate.

8. The global interconnect of claim 4 wherein the microstructures further comprises either a Swiss roll capacitor or a split ring resonator.

9. An integrated circuit comprising:
    one or more interconnected internal components supported by a first substrate; and
    one or more metamaterial-based waveguides supported by a second substrate and located opposite the first substrate that distribute electromagnetic waves to antennae of the internal components in order to induce an oscillating current within the internal components that serves as a clock signal.

10. The integrated circuit of claim 9 further comprises an electromagnetic radiation source that radiates electromagnetic waves of radiation.

11. The integrated circuit of claim 10 wherein the electromagnetic radiation source further comprises either a tapered optical fiber or a tapered coaxial cable located next to the metamaterial-based waveguides.

12. The integrated circuit of claim 9 wherein the internal components are logic circuits.

13. The integrated circuits of claim 9 wherein the internal components are memory.

14. The integrated circuit of claim 9 wherein the internal components are processing units.

15. The integrated circuit of claim 9 wherein the interconnected internal components further comprises the antennae for receiving the clock signals transmitted by the metamaterial-based waveguides.

16. The integrated circuit of claim 9 wherein the first substrate further comprises interconnects for transmitting data between computing devices.

17. The integrated circuit of claim 9 wherein the metamaterial-based waveguide further comprises a two-dimensional regular lattice of microstructures.

18. The integrated circuit of claim 17 wherein the two-dimensional regular lattice of microstructures further comprises the microstructures located on a surface of the second substrate.

19. The integrated circuit of claim 17 wherein the two-dimensional regular lattice of microstructures further comprises the microstructures embedded within the second substrate.

20. The integrated circuit of claim 19 wherein the microstructures embedded within the second substrate further comprises the microstructures extending above the top surface of the second substrate and the microstructures extending below the bottom surface of the second substrate.

21. The integrated circuit of claim 17 wherein the microstructures further comprises either a Swiss roll capacitor or a split ring resonator.

22. A method for distributing a clock signal to internal components of an integrated circuit, the method comprising:
providing one or more interconnected internal components;
providing one or more metamaterial-based waveguides; and
distributing a transverse magnetic field mode of an electromagnetic wave to antennae of the internal components in order to induce an oscillating current within the internal components that serves as the clock signal.

23. The method of claim 22 further comprises providing electromagnetic radiation source that supplies the electromagnetic waves of radiation.

24. The method of claim 23 wherein providing the electromagnetic radiation source further comprises providing a tapered optical fiber or a tapered coaxial cable located next to the metamaterial-based waveguides.

25. The method of claim 22 wherein the internal components are logic circuits.

26. The method of claim 22 wherein the internal components are memory.

27. The method of claim 22 wherein the internal components are processing units.

28. The method of claim 22 wherein providing the one or more interconnected internal components further comprises providing a substrate that includes interconnects for transmitting data between the internal components.

29. The method of claim 22 wherein the metamaterial-based waveguide further comprises a two-dimensional regular lattice of microstructures.

30. The method of claim 29 wherein the two-dimensional regular lattice of microstructures further comprises the microstructures located on a surface of a second substrate.

31. The method of claim 29 wherein the two-dimensional regular lattice of microstructures further comprises the microstructures embedded within a second substrate.

32. The method of claim 31 wherein the microstructures embedded within the second substrate further comprises the microstructures extending above the top surface of the second substrate and the microstructures extending below the bottom surface of the second substrate.

33. The method of claim 31 wherein the microstructures further comprises either a Swiss roll capacitor or a split ring resonator.

* * * * *

UNITED STATES PATENT AND TRADEMARK OFFICE
CERTIFICATE OF CORRECTION

PATENT NO. : 7,545,242 B2 Page 1 of 1
APPLICATION NO. : 11/264410
DATED : June 9, 2009
INVENTOR(S) : Raymond G. Beausoliel et al.

It is certified that error appears in the above-identified patent and that said Letters Patent is hereby corrected as shown below:

In column 12, line 37, in Claim 7, delete "substate" and insert -- substrate --, therefor.

In column 13, line 34, in Claim 22, after "providing" insert -- an --.

Signed and Sealed this

Thirtieth Day of March, 2010

David J. Kappos
*Director of the United States Patent and Trademark Office*